Jan. 18, 1944. G. A. CHARLSTON 2,339,459
GUARD FOR GLASS COFFEE MAKERS
Original Filed Sept. 7, 1940
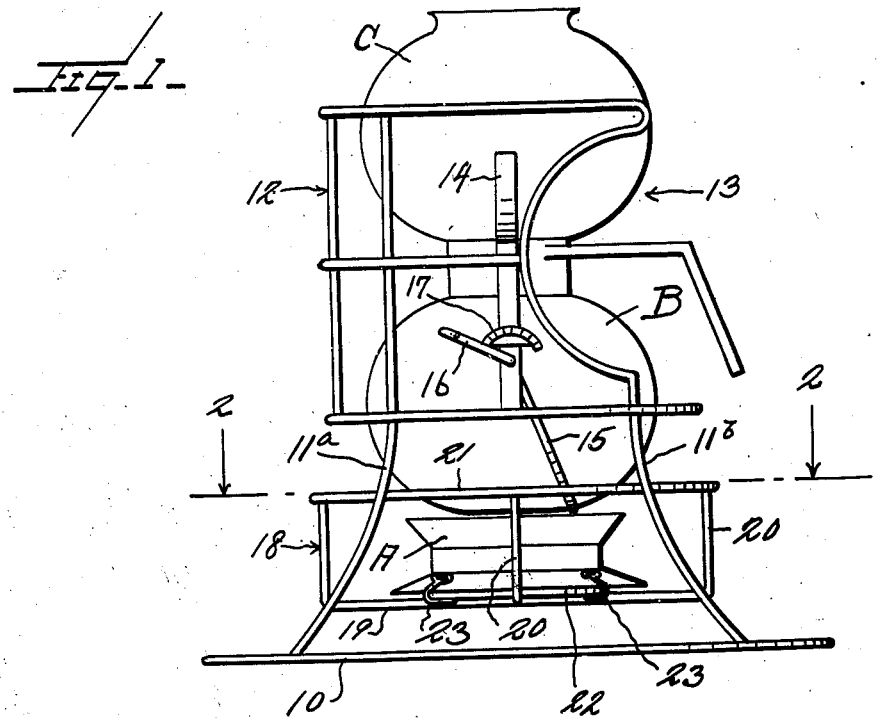
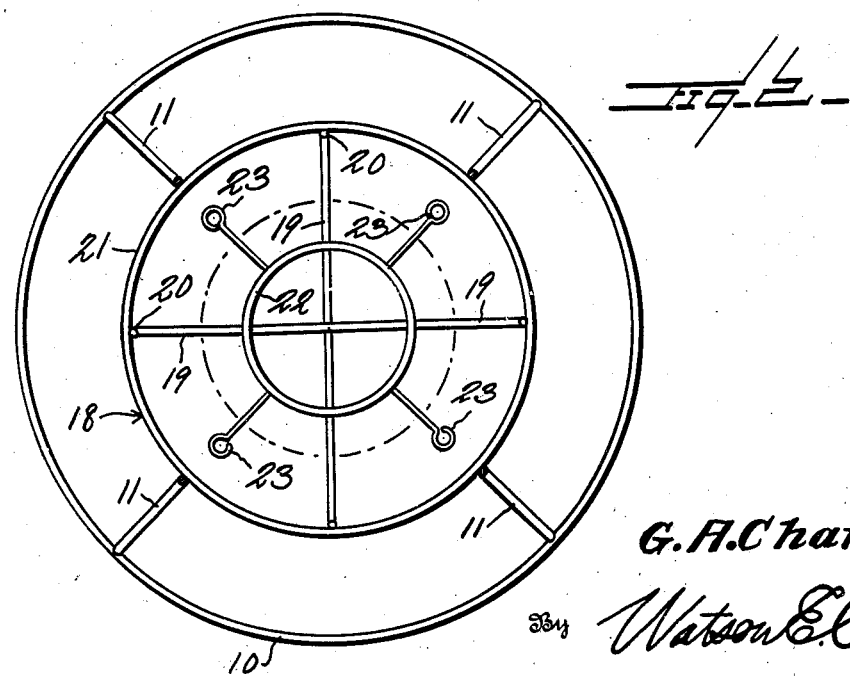
Inventor
G. A. Charlston
By Watson E. Coleman
Attorney Patented Jan. 18, 1944

2,339,459

UNITED STATES PATENT OFFICE 2,339,459

GUARD FOR GLASS COFFEE MAKERS

Gustave A. Charlston, Portland, Oreg.

Substituted for abandoned application Serial No. 355,836, September 7, 1940. This application April 14, 1943, Serial No. 483,023

3 Claims. (Cl. 99—290)

This invention relates to devices for use in connection with glass coffee makers for the purpose of protecting or guarding the same, and constitutes an improvement upon the device illustrated in my Patent No. 2,135,102 of November 1, 1938.

The principal object of the present invention is to provide in a protecting or guarding device for glass coffee makers such as is disclosed in the above stated patent, an improved means for supporting and securing in position the base unit of the coffee maker upon which the bulbous glass units rest while the device is in operation, this improved supporting means maintaining the said base unit in raised position with respect to the surface upon which the guard is supported and securely or firmly holding the base against movement from its proper operating position.

Another object of the invention is to provide an improved base supporting means for a glass coffee maker protecting or guarding device having a novel means for securely locking such base unit in position, such locking means being adaptable to base units of different sizes.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in side elevation of the glass coffee maker guard showing the present invention as a part thereof.

Fig. 2 is a sectional view on the line 2—2 of Fig. 1.

Referring now more particularly to the drawing, the numeral 10 designates the base of the protecting device, which base is here illustrated as being in the form of a ring of wire of suitable weight although it is to be understood that there is no intention of limiting the invention to the use of wire although this material is preferred.

Extending upwardly from the base 10 are the vertical wires or standards 11ª and 11ᵇ, which are attached at their lower ends to the base ring, as shown. These vertical wires or standards are slightly curved from their lower ends where they are attached to the base 10 to extend inwardly and upwardly and they are joined at their upper ends by other wires to form the protective cage for the coffee maker.

Since the upper portion of the protecting structure is fully described and claimed in my previous patent, no detailed description will be given here of this part of the structure. The entire upper part of the protecting cage is, therefore, generally indicated by the numeral 12, such upper part being connected with the uprights 11ª and 11ᵇ, as shown, and having an open front 13 to facilitate the introduction of the coffee maker into the protecting cage.

The numeral 14 designates handles at the sides of the cage and these handles support the semicircular cradle 15 which is oscillatably mounted so as to be rocked into a position beneath the lower one of the two bulbous portions of the coffee maker for the purpose of lifting the same from its underlying support.

The said underlying support or base portion for the coffee maker is indicated by the character A while the lower one of the bulbous glass portions is indicated by the character B, and the upper one of such glass portions is indicated by the character C. The handle 16 which is connected with the cradle 15 facilitates the rocking of the cradle into or out of its working or supporting position and the cradle is held in a desired position through the sliding engagement of the handle over the notched rack 17.

The foregoing features of the coffee maker protecting or guarding device have only generally been referred to in view of the fact that they are specifically described and claimed in my prior patent and the improved feature for this coffee maker guard device will now be specifically described.

In accordance with the present invention, there is mounted within the space defined by the uprights 11ª and 11ᵇ, the basket-like supporting structure for the base unit A of the coffee maker which is indicated generally by the numeral 18. This basket-like portion is made up of the crossed arms 19, each of which has a turned up end portion forming a vertical post 20. The upper ends of these posts 20 are joined together by the ring 21 and this ring contacts the standards 11ª—11ᵇ, and is secured thereto by any suitable means such as welding, brazing or the like. Resting upon the cross arms 19 of the basket structure is a ring 22 of materially smaller diameter than the peripheral ring 21 for the basket, which smaller ring is secured in any suitable manner to the arms 19 and cooperates with such arms to form the supporting bottom for the basket.

Joined in a suitable manner to the ring 22 are the radially extending fingers 23 which are formed of wire having a high degree of ductility. The bottom of the basket is supported in a plane above the bottom ring 10 of the protecting device and thus it will be seen that when a base unit A for a coffee maker is placed within the basket, it will be supported clear of the surface upon which the protecting device is placed.

When the base unit A is placed in the basket, it will, of course, rest upon the arms 19 and in order to hold it firmly against movement, the securing fingers 23 are bent up over the edge of the base A in the manner illustrated, thereby clamping the base from four positions and preventing either lateral movement or vertical movement.

It will be understood that the coffee maker is illustrated with the glass portions raised or in inoperative position with respect to the base A, being held in this position by the cradle 15. In this position, the heating base unit which is provided with an electrical resistance heater, not shown, may be kept going or lighted so as to keep the coffee in the globe B warm without causing it to boil. When the coffee is to be boiled as in the making of the same, it will be understood that the cradle will be shifted to one side so as to lower the bulbs or globes so that the lower one will rest upon the base. By making the fingers 23 of a highly ductile material, the fingers may be bent any desired number of times for removing and replacing the base unit, and also it will be apparent that base units of different sizes can be readily secured in position in the basket by bending the fingers farther from the ring 22 or nearer to the ring, as may be necessary.

It has previously been stated that the securing fingers 23 are bent up over the edge of the base A, as illustrated, however, it is to be pointed out that in some cases, heating units are provided which have straight sides rather than inwardly curving sides and in such cases, the securing fingers would merely be bent up along the sides of the heater instead of bent inwardly and over the edge of the same, as illustrated.

While in the title as set forth and in the foregoing description, reference has been made to the present device as being a guard for glass coffee makers, it is to be understood that the invention is not to be limited to use entirely with coffee makers formed of glass, as it will be readily obvious that it may be used as a guard for coffee makers which are formed of metal or other materials, therefore, it will be clear that in referring to "glass", other materials are also understood.

This application is in substitution for an abandoned application Serial No. 355,836, filed September 7, 1940.

What is claimed is:

1. In a safety guard for a coffee machine, having a base, upwardly extending members carried by the base, and a frame supported above the base by said upwardly extending members within which the coffee machine may be disposed; means for supporting the heating element of the coffee machine comprising an open top basket-like unit disposed within the space defined by said upwardly extending members and in which said heating element may be placed, said unit having its sides secured to said members and supported thereby in a plane above the base, and a plurality of finger members formed of ductile material and connected with the bottom part of the basket-like base unit to be bent upwardly and over the bottom part of the heating element of the coffee machine to secure the latter in position within the basket.

2. In a safety guard for a coffee machine, having a base, upwardly extending members connected with the base and a frame carried by said upwardly extending members within which the coffee machine may be disposed; means for supporting the heating element of the coffee machine, comprising an open top basket-like unit disposed within the space defined by the upwardly extending members and comprising crossed arms having upwardly extending end portions, a ring connecting the upwardly extending end portions of said crossed arms, said ring being secured to said upwardly extending members, a ring supported by said arms concentrically with the first ring, and a plurality of bendable fingers connected with the second-mentioned ring to be bent over the bottom part of a heating element disposed upon the supporting arms.

3. In a safety guard for a coffee machine having a base, upwardly extending members carried by the base and a frame supported above the base by said upwardly extending member within which the coffee machine may be disposed; supporting means for the heating element of the coffee machine comprising a horizontal platform connected with said upstanding members and supported thereby in spaced relation with and above the base, and a plurality of wires of ductile metal secured to the platform and extending radially from a common center in the plane of the platform, the wires being adapted to have outer end portions thereof bent upwardly around and in securing relation with a heating element on the platform to maintain the element in position.

GUSTAVE A. CHARLSTON.